United States Patent [19]
Eubank et al.

[11] Patent Number: 5,209,458
[45] Date of Patent: May 11, 1993

[54] FLEXIBLE LEVELING DEVICE AND METHOD OF USE

[76] Inventors: Mark A. Eubank, 700 Willowood, Longview, Tex. 75604; Michael P. Eubank, 237 Mosley Cir. South, Longview, Tex. 75601

[21] Appl. No.: 661,428
[22] Filed: Feb. 25, 1991
[51] Int. Cl.$^5$ .............................................. E02C 3/00
[52] U.S. Cl. .............................. 254/88; 254/133 R; 188/32; 248/352
[58] Field of Search .............. 254/88, 133 R; 188/32; 248/352, 668

[56] References Cited

U.S. PATENT DOCUMENTS

| | | | |
|---|---|---|---|
| 3,532,149 | 11/1950 | Cone | 254/88 |
| 4,103,870 | 8/1978 | Murakami | 254/88 |
| 4,427,179 | 1/1984 | Price | 259/88 |

Primary Examiner—Bruce M. Kisliuk
Assistant Examiner—Eileen Morgan
Attorney, Agent, or Firm—Ronald B. Sefrna

[57] ABSTRACT

The present invention discloses a flexible leveling device for the leveling of various vehicles, particularly recreational vehicles. In the preferred embodiment, the flexible leveling device of the invention generally comprises an elongate member of flexible material, with first and second ends, having a series of separated elements, preferably blocks, of steadily increasing height interconnected thereto. Each of the separated elements is interconnected to the flexible member, starting at the first end thereof with the shortest element, progressing with successively longer elements to form a steady incline, and extending through the length of such member to the second end thereof. Each separated element is disposed on the flexible member so as to provide a uniform space between adjacent elements, allowing the device to be formed into a curved configuration for use, or to be folded over or rolled to facilitate storage. In use, a device of the invention is placed adjacent to each tire on the side of the vehicle to be leveled, and the vehicle is moved onto the device(s) until the desired level is achieved.

30 Claims, 6 Drawing Sheets

FLEXIBLE LEVELING DEVICE AND METHOD OF USE

FIELD OF THE INVENTION

The present invention generally relates to devices for the leveling of vehicles, and more specifically relates to a device particularly useful for the leveling of recreational vehicles having a series of flexibly interconnected and spaced elements of steadily increasing height, and to a method of leveling recreational vehicles using the device.

BACKGROUND OF THE INVENTION

With the growth in popularity of recreational camping in recent years, the utilization of recreational vehicles of the types known as "motor homes" and "camper trailers" by the public has correspondingly increased. Such recreational vehicles ("RVs") are often utilized for short stays at campgrounds and the like, and must be parked on ground surfaces which are not uniformly flat and level. As a result, it is desirable, and commonly necessary, for such Rvs to be leveled about an axis parallel to the axle(s) of the RV and about the longitudinal axis of the RV. Leveling about the "axle axis" usually presents a less difficult problem relative to the leveling about the longitudinal axis which has presented more of a problem for the RV users.

Various approaches to vehicle leveling have been attempted and are known in the prior art, but none of the approaches have successfully provided a simple, inexpensive, lightweight, and low maintenance device and method of use to efficiently accomplish the task of leveling both single and multi-axle RVs. Leveling devices are known in the prior art and several approaches disclose the use of automatic leveling systems, typically hydraulically or pneumatically actuated. These approaches are highly effective but suffer the disadvantages of initial high cost, mechanical complexity, heavy weight, and constant maintenance. Accordingly, such systems are typically available only on high cost RVs, making them effectively unavailable to the majority of RV users.

Another approach utilizes manually operated jacks to raise the RV, but that approach has its own disadvantages. Those disadvantages include difficulty of operation, reduction of vehicle stability, unnecessary weight, and maintenance requirements. In another approach, rigid wedges or blocks are placed in front of or behind the wheel(s) on the side of the RV to be raised and the Rv is driven onto the wedges or blocks. Some designs provide depressions in the upper surface of the wedges to receive a portion of a tire to help stabilize the RV without the need for wheel chocks. The use of such rigid blocks presents its own further set of disadvantages, including difficulty of storage and, especially with tandem or multi-axle RVs, the inability to place a wedge of sufficient length between the tires to be elevated and the inability to evenly distribute the load between or among the axles.

U.S. Pat. No. 2,532,149 to Cone discloses a tire chain installer and car mover device which provides a flexible base made of a resilient material such as rubber or the like with a ramp section and a platform section rigidly secured thereto. Cone teaches that the ramp and platform sections are essentially flat except for a short inclined forward portion of the ramp section to facilitate driving the vehicle thereon. Furthermore, the ramp and platform sections are separated, leaving a space therebetween to restrain a vehicle tire from rolling once properly positioned upon the device. This approach does not contemplate use of the disclosed device for vehicle leveling, and even if used as such the device would necessarily allow only a single specific amount of height adjustment to be gained rather than allowing progressive leveling. Devices of this approach also appear to lack the flexibility required to fit such a device between the tires of a tandem or multi-axle vehicle.

U.S. Pat. No. 576,825 to Roemheld discloses a means for raising swing-bridges which provides a plurality of interlocking elongated wedges of increasing height designed to enable the replacement of worn swing-bridge wheels. This approach principally addresses the raising of the entire structure uniformly rather than the leveling of the structure. Furthermore, this approach does not address or provide for flexibility of the interconnected wedges.

U.S. Pat. No. 3,752,441 to Rogers discloses a vehicle wheel elevating and leveling device which provides a plurality of individual step-like sections arranged in end-to-end alignment to form an extendable and retractable telescoping unit. This approach principally contemplates use of the device to only approximately elevate the vehicle to a near level position so as to avoid stabilizing jacks used in conjunction with the device from being overloaded by lifting a wheel of the vehicle off the ground. Consequently, this approach provides a limited leveling capability as dictated by the incremental height of each step-like section.

All known prior art devices which elevate the wheels and tires on one side of a multi-axle vehicle fail to elevate those wheels and tires to the same height. As a result, weight distribution and spring compression among the axles is uneven, reducing stability and increasing the probability of spring overload.

There remains an unfilled need for a simple, inexpensive, and low maintenance flexible leveling device capable of providing an effective means of readily leveling an RV with single or multiple axles, while addressing and overcoming the disadvantages associated with devices known in the prior art.

SUMMARY OF THE INVENTION

The flexible leveling device of the invention generally comprises an elongate flexible member with first and second ends, having a series of separated bodies of steadily increasing height interconnected thereto. In the preferred embodiment, each of such bodies has a flat bottom so as to provide a stable support base and sufficient area for interconnection to the flexible member, straight sides perpendicular to the bottom, and an inclined top surface. Each of the series of bodies is interconnected to the upper surface of the flexible member, starting at the first end thereof with the shortest side of the shortest body, progressing with successively higher bodies to form a steady incline, and continuing through the length of the flexible member to the second end thereof. Each body is disposed on the flexible member so as to provide a uniform space between adjacent bodies, allowing the device to be formed into a curved configuration for use, or to be folded over or rolled to facilitate storage.

The device of the invention is provided in cooperating units for use with tandem or multi-axle Rvs, where the upper surface of the final or highest body of all but one device of the unit is inclined in the opposite direction from the other bodies interconnected to the flexible member. The reverse incline of the final body provides a ramp, allowing the RV to be driven over the device from the second end without difficulty.

In using the device of the invention in conjunction with a tandem axle RV, the Rv is initially driven to the location where it is to be leveled, and a first device is placed immediately behind the rear tandem wheel of the side of the Rv to be elevated, with the first, or lower, end of the device adjacent to the tire of that wheel. A second device, with a reversed final body, is next placed with its first, or lower, end adjacent to the tire of the front tandem wheel, and, with the device formed into a curved configuration in the space between the front and rear tandem tires, the lower surface of the flexible member is placed against the rear tandem tire. With the two devices in place, the RV is slowly moved backward onto the devices until the side of the RV over the two devices has been raised to the desired level. The two devices remain fixed in position relative to the ground as the RV is moved, and the second end of the forward device will drop to the ground from its original position against the rear tandem tire, allowing the front tandem tire to move onto such device without restriction. Since both wheels on the elevated side of the Rv are raised an equal distance, load is evenly distributed between the axles and maximum stability is achieved. When the Rv is properly positioned and leveled, wheel chocks are preferably used on both sides of the RV to generally assure stability and to prevent the RV from rolling off the devices of the invention. Wheel chocks can be most effectively used by placing one in front of the front tandem tire of the Rv and one behind the rear tandem tire of the RV and the rear body of the device adapted for use in association with the rear tandem tire may be provided with a flat upper surface to facilitate placement of a wheel chock thereon. Wheel chocks utilized in conjunction with the devices of the invention should be provided with a rough lower surface to minimize any tendency of the chocks to slide over the surface of the bodies upon which such chocks are placed.

When it is desired to move the RV to another location, the wheel chocks are first removed and the RV is simply driven or towed forward so that the tires move to the first, or lower, ends of the devices and to the ground. In this process, the rear tandem wheel must pass over the forward of the two devices from the second, or higher, end thereof. The reverse incline of the final body of the forward device facilitates the movement of the rear tandem wheel onto and over that device. When the RV is moved off the devices, they may be easily rolled or folded for convenient storage until they are again needed.

In using the device of the invention in conjunction with a multi-axle RV, with three or more axles to be leveled, a method to that described for a tandem axle RV is employed. The multiaxle RV, however, will require an additional second device with a reversed final body for each additional axle.

The device of the invention may also be used to level a RV about the "axle axis" of the RV by using only a single device under one tire of the RV. The device of the invention may also be used to level a RV about the "axle axis" of the RV in conjunction with leveling the RV about the longitudinal axis by staggering two such devices so that one tire of the RV begins the incline of one device before the other tire of the RV begins the incline of the other device. Consequently, a combination of devices of the invention may be used to accommodate a multitude of RV leveling problems.

Among the various objects of this invention, one object is to provide a new and novel flexible leveling device which requires minimal effort to place and is simple to use.

Another object of this invention is to provide a new and novel flexible leveling device which is inexpensive and readily available to the majority of RV users.

A further object of this invention is to provide a new and novel flexible leveling device which is low in maintenance.

A still further object of this invention is to provide a new and novel flexible leveling device which is readily usable with both single and multi-axle Rvs and provides maximum stability and equal load distribution among multiple axles.

Yet another object of this invention is to provide a new and novel flexible leveling device which allows for convenient storage of the device.

The structure and use of the preferred embodiment of the flexible leveling device of the invention will now be described in more detail, with reference to the accompanying drawing figures.

DETAILED DESCRIPTION OF THE INVENTION

Figure 1:
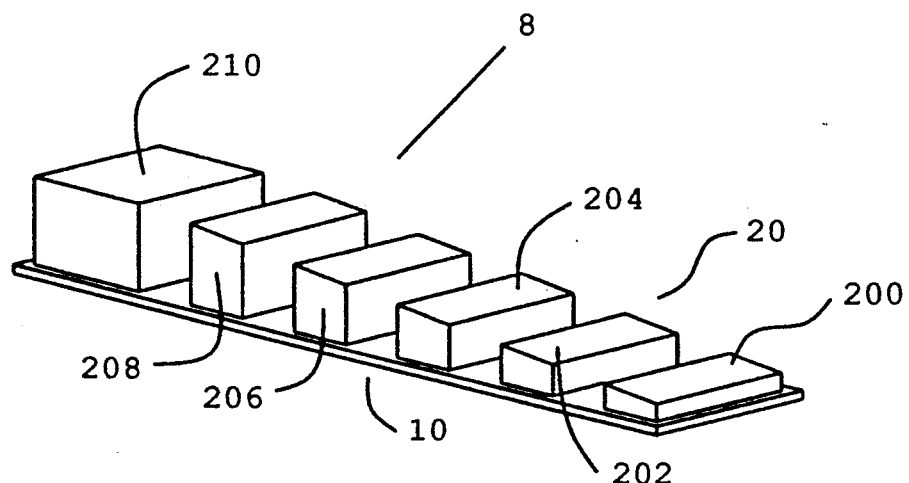
FIG. 1 is a perspective view of the preferred embodiment of the flexible leveling device of the invention.
Figure 2:
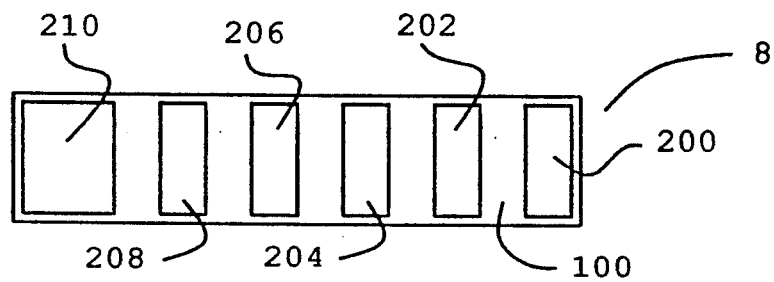
FIG. 2 is a plan view of the preferred embodiment of the flexible leveling device of the invention.
Figure 3:
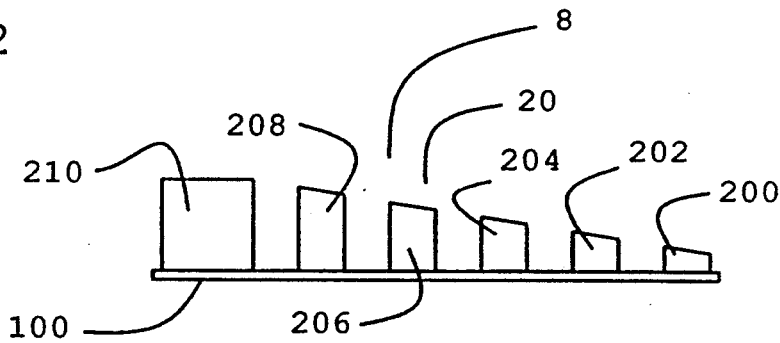
FIG. 3 is a side view of the preferred embodiment of the flexible leveling device of the invention.
Figure 4:
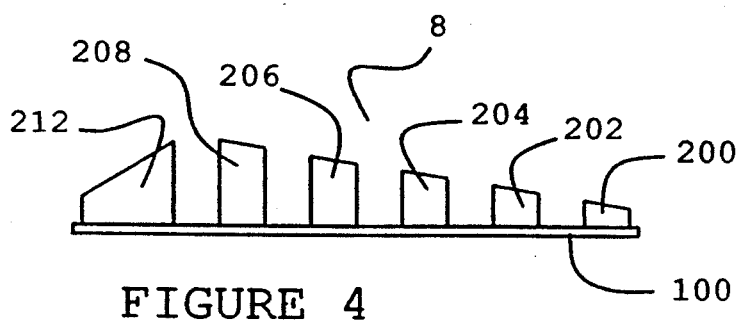
FIG. 4 is a side view of a variation of the preferred embodiment of the flexible leveling device of the invention to provide cooperating units of the device for use with tandem or multi-axle RVs.

With reference to the seventeen (17) accompanying figures, and initially to FIG. 1, the flexible leveling device of the invention, generally designated by reference numeral 8, is shown to comprise at least one elongate flexible member 10, with a series of elements, collectively designated as 20, of steadily increasing height interconnected thereto. Elements 20 are disposed and interconnected by flexible member 10 in a spaced array of steadily increasing height, starting at a first end with the shortest element, progressing with successively higher elements to form a steady incline therewith extending through the length of device 8 to the second end thereof. Each separated element is disposed in relation to flexible member 10 so as to provide a uniform space between adjacent elements, allowing device 8 to be readily placed in a curved configuration for use as described below and to be folded over or rolled for storage.

In the preferred embodiment(s) shown in FIGS. 2 through 4 and 7 and 8, elongate flexible member 10 is an elongate flexible strip 100 approximately 24 inches in length and 7 inches in width formed of a rubber-like material. Also, the elements 20 preferably comprise a series of solid hard rubber blocks such as 200, 202, 204, 206, 208, and 210. Each of the preferred blocks 200, 202, 204, 206, and 208 has a flat bottom so as to provide a sufficient support base and rigid interconnection to flexible strip 100 with dimensions of approximately 3¼ inches measured along the length of flexible strip 100 by 7 inches measured across the width of flexible strip 100, straight sides perpendicular to the bottom with varying perpendicular dimensions from the bottom ranging from approximately ¼ inch to 3¼ inches, and a roughened top surface inclined approximately 10 degrees from a plane formed by flexible strip 100. Although it is preferred that the tops of the blocks be inclined, it will be understood that the top of each of such blocks may be parallel to the base without departing from the scope of the invention. Preferred block 210 has a flat bottom so as to provide a sufficient support base and rigid interconnection to flexible strip 100 with dimensions of approximately 7½ inches measured along the length of flexible strip 100 by 7 inches measured across the width of flexible strip 100, straight sides perpendicular to the bottom with a perpendicular dimension from the bottom of approximately 3¼ inches, and a roughened top surface parallel to a plane formed by flexible strip 100. When cooperating units of the device of the invention are required for tandem or multiaxle Rvs, preferred block 210 of the first device, as defined above, is replaced with preferred block 212 to form a variation of the preferred embodiment of the device. Preferred block 212 has a flat bottom so as to provide a sufficient support base and rigid interconnection to flexible strip 100 with dimensions of approximately 3¼ inches measured along the length of flexible strip 100 by 7 inches measured across the width of flexible strip 100, straight sides perpendicular to the bottom with varying perpendicular dimensions ranging from approximately 3¼ inches to ¼ inch, and a roughened top surface inclined in the opposite direction of blocks 200, 202, 204, 206, and 208 approximately 35 degrees from a plane formed by flexible strip 100 so as to allow the RV to more easily be driven over the device. The preferred rigid interconnection between flexible strip 100 and blocks 200, 202, 204, 206, 208, 210, and 212 is formed by using a vulcanizing (heat and pressure) process.

In an alternative embodiment, preferred flexible strip 100 may be manufactured from materials other than a rubber-like material, such as light gauge metal, different types of webbing products or any other suitable material capable of providing the necessary flexibility for the device of the invention and compatible with the environment in which it is to be used. Also, preferred blocks 200, 202, 204, 206, 208, 210, and 212 may be hollow to further reduce the weight of the device, provided a sufficient support base remains to withstand the force applied by the RV and its contents and without adversely affecting flexible strip 100 and the ground surface upon which the device is placed. Furthermore, said preferred blocks may be constructed of many types of materials in addition to the preferred hard rubber, such as wood, metal or plastic, so long as the material is suitable for accomplishing the purpose of the device of the invention and compatible with the environment in which it is to be used. The preferred rigid interconnection between flexible strip 100 and blocks 200, 202, 204, 206, 208, 210, and 212 may be performed in any number of ways, such as the device being integrally formed in a single unit, using interconnecting fasteners, or using an adhesive product and associated process.

Figure 9:
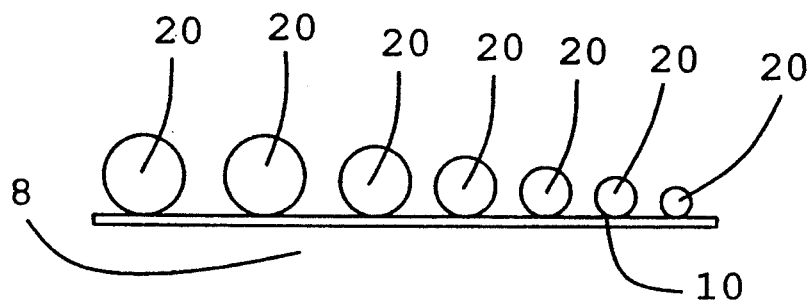
FIG. 9 is a side view of an alternative embodiment of the flexible leveling device of the invention using circular elements.

In another alternative embodiment, illustrated in FIG. 9, elements 20 may comprise a plurality of elements of circular cross-section with steadily increasing diameters, interconnected by flexible member 10, starting at the first end thereof with the smallest diameter element, progressing with successively larger diameter elements forming a steady incline therewith, and extending through the length of member 10 to the second end thereof. Such circular elements may have approximate increasing dimensions such as ¼ inch, ¾ inch, 1¼ inches, 1⅝ inches, 2⅜ inches, 3½ inches, and 3¼ inches in diameter by 7 inches in length as measured across the width of a flexible strip 100. Again, when cooperating units of the device of the invention are required for tandem or multi-axle RVs, the final, largest element of the first device is replaced with an element of approximately 2 inches in diameter to form the second device in order to allow the RV to more easily be driven over the second device.

Figure 10:
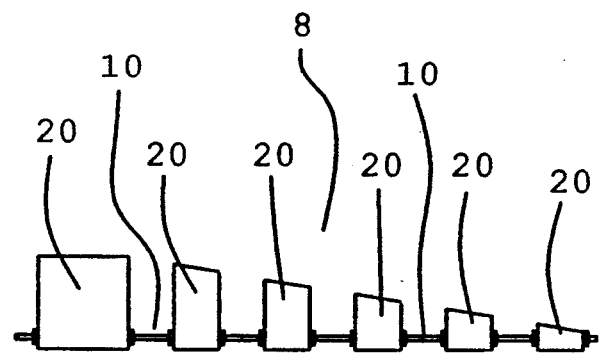
FIG. 10 is a side view of an alternative embodiment of the flexible leveling device of the invention using a chain or cable for the elongate flexible member.

In yet another alternative embodiment, illustrated in FIG. 10, flexible member 10 may comprise one or more cable(s) or chain(s) 30 interconnected to each of separated elements 20. The interconnection between the chain or cable and separated elements 20 may be provided by any number of means such as creating a hole in each separated element, passing the chain or cable through said hole, and then using a clamping means to secure each separate element to said chain or cable.

Figure 11:
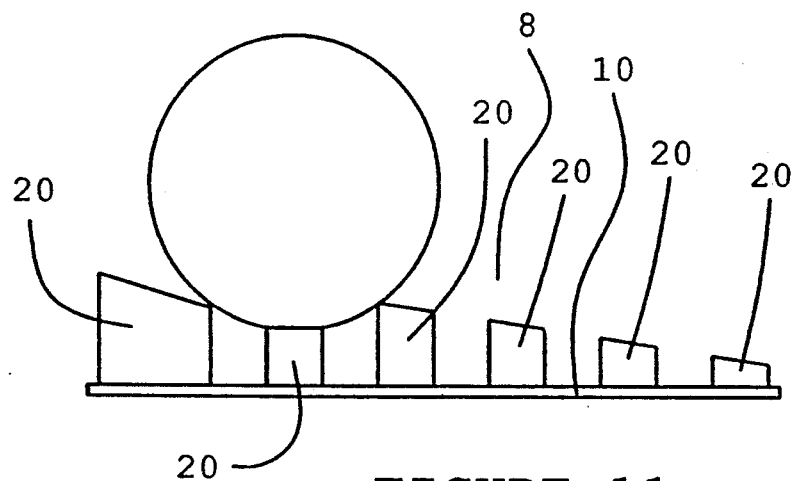
FIG. 11 is a side view of an alternative embodiment of the flexible leveling device of the invention adjusting the separated elements of steadily increasing height.

In another alternative illustrated in FIG. 11, separated elements 20 of steadily increasing height of the device of the invention can be modified when very particular circumstances arise, such as the user has predetermined that a specific height of leveling is required for a particular site. The separated elements may then be modified in a fashion to provide a shorter portion of steadily increasing heights along the length of flexible member 10, starting at the first end thereof and then provide a circularly-shaped depressed region capable of accepting and restraining the tire of the RV much like the restraining characteristics of chocks at the second end thereof.

Figure 12:
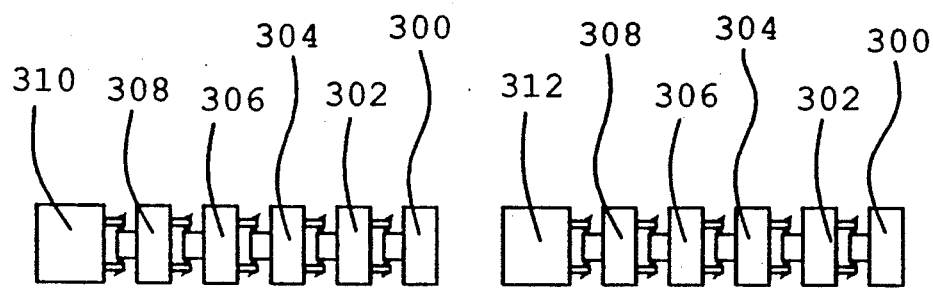
FIG. 12 is a plan view of an alternative embodiment of the flexible leveling device of the invention using rigid links with a form of pivotal interconnection therebetween.
Figure 13:
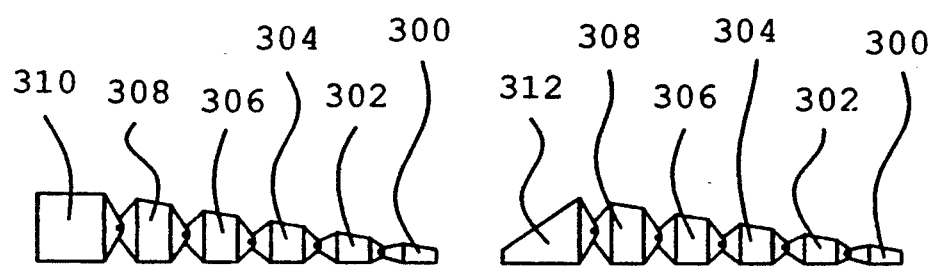
FIG. 13 is a side view of an alternative embodiment of the flexible leveling device of the invention using rigid links with a form of pivotal interconnection therebetween.
Figure 14:
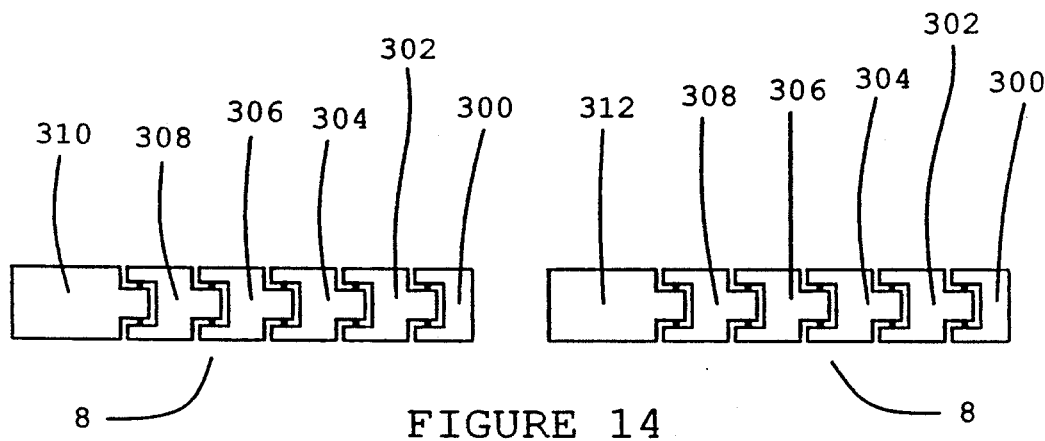
FIG. 14 is a plan view of an alternative embodiment of the flexible leveling device of the invention using interlocking rigid links with a means of pivotal interconnection therebetween.
Figure 15:
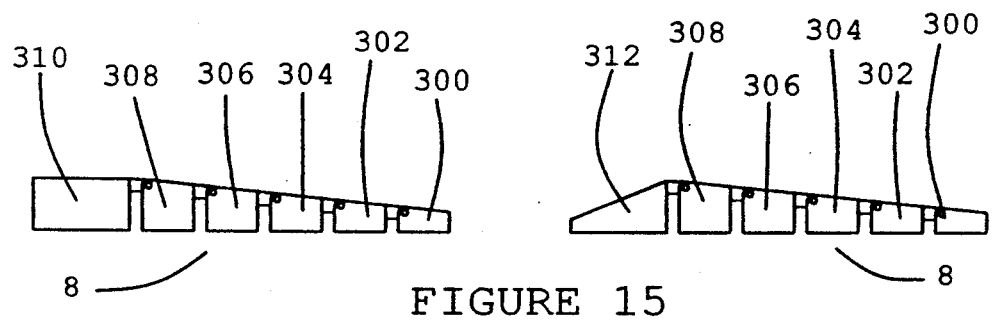
FIG. 15 is a side view of an alternative embodiment of the flexible leveling device of the invention using interlocking rigid links with a means of pivotal interconnection therebetween.

In another alternative embodiment illustrated in FIGS. 12 through 15, flexible member 10 may be eliminated and separated elements 20 may comprise a plurality of separated elements, collectively numbered as 30, of steadily increasing height with pivotal interconnections therebetween. As illustrated elements 30 comprise rigid links 300, 302, 304, 306, 308, 310, and 312. Such rigid links are functionally equivalent to the blocks 200, 202, 204, 206, 208, 210, and 212, respectively, of the preferred embodiment. The interconnection between such rigid links between is formed by providing a means for rotating each rigid link independently about a pin, such as a hinge mechanism, which would thus allow the necessary flexibility for the device of the invention. As an example, the interconnection may be provided by mating protrusions from each rigid link as shown in FIGS. 12 and 13 or by interlocking rigid links as shown in FIGS. 14 and 15. Each rigid link may be manufactured from a rubber-like material, metal, plastic or other suitable material capable of providing sufficient support for the RV and its contents.

Figure 16:
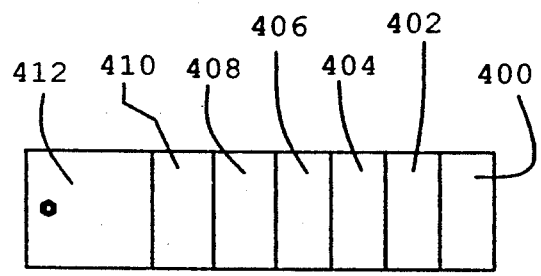
FIG. 16 is a plan view of an alternative embodiment of the flexible leveling device of the invention using flexible separated pads with a means for securing each pad.
Figure 17:
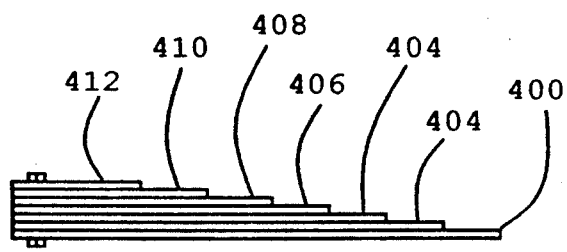
FIG. 17 is a side view of an alternative embodiment of the flexible leveling device of the invention using flexible separated pads with a means for securing each pad.
Figure 18:
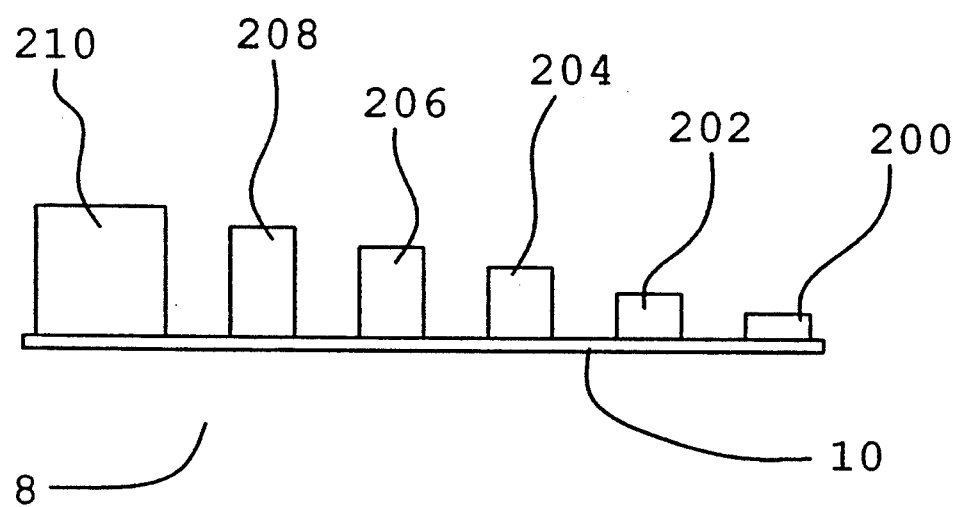
FIG. 18 is a side view of an alternative embodiment of the flexible leveling device of the invention using flat topped blocks.

In yet another alternative embodiment, illustrated in FIGS. 16 and 17, separated elements 20 are replaced by a plurality of flexible elements similar to member 10, collectively designated by reference numeral 40, of steadily decreasing length. The plurality of flexible separated elements 40 more specifically comprises flexible pads 400, equivalent to strip 100, with additional pads 402, 404, 406, 408, 410, and 412, all having a first end and a second end, stacked one upon another starting with the longest pad on the bottom, progressing with successively shorter pads, and ending with the shortest pad on top. Each such pad is approximately ½ inch thick. The flexible pads are interconnected at a point intermediate their first and second ends, thus allowing the pads to move relative to each other so as to provide the necessary flexibility. Such interconnection may be formed by bolting or other convenient means. Each flexible pad may be manufactured from a rubber-like material or other suitable material capable of providing sufficient support for the Rv and its contents.

Figure 5:
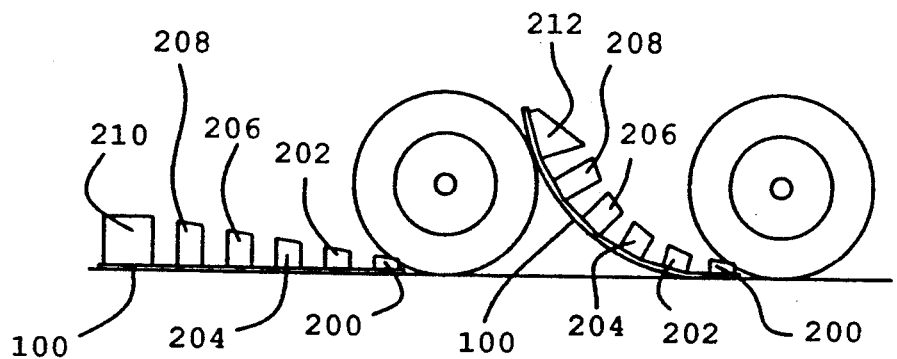
FIG. 5 is a side elevation view of the preferred embodiments of the flexible leveling device of the invention for use with a tandem axle RV with the devices in place in conjunction with the RV.
Figure 6:
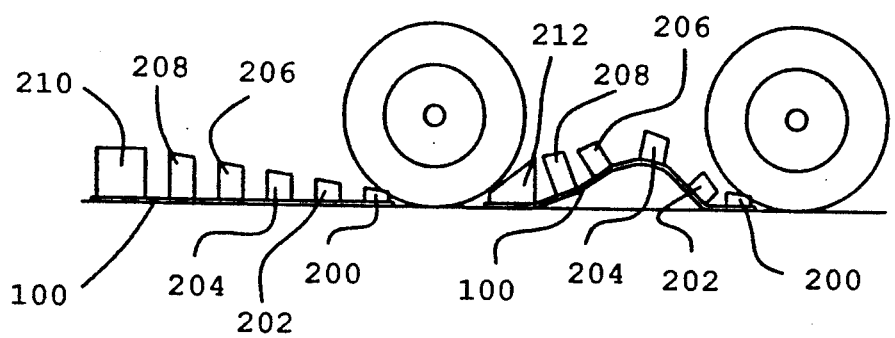
FIG. 6 is a side elevation view of the preferred embodiments of the flexible leveling device of the invention for use with a tandem axle RV with the devices in an alternative placement in conjunction with the RV.
Figure 7:
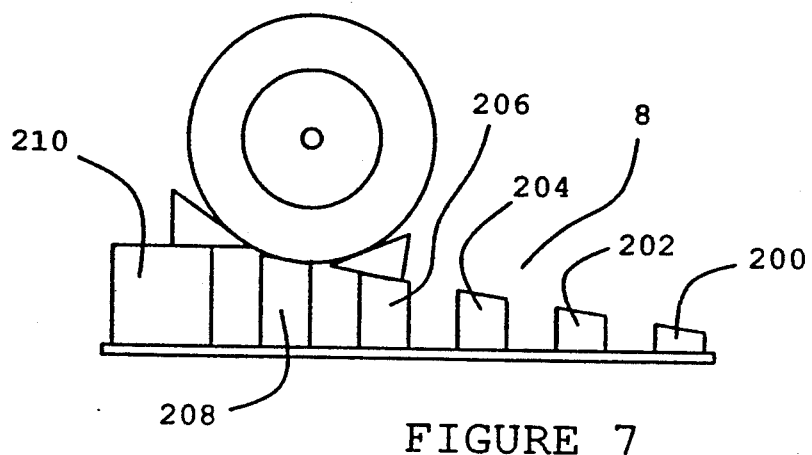
FIG. 7 is a side elevation view of the preferred embodiment of the flexible leveling device of the invention with a single axle RV elevated and chocked.
Figure 8:
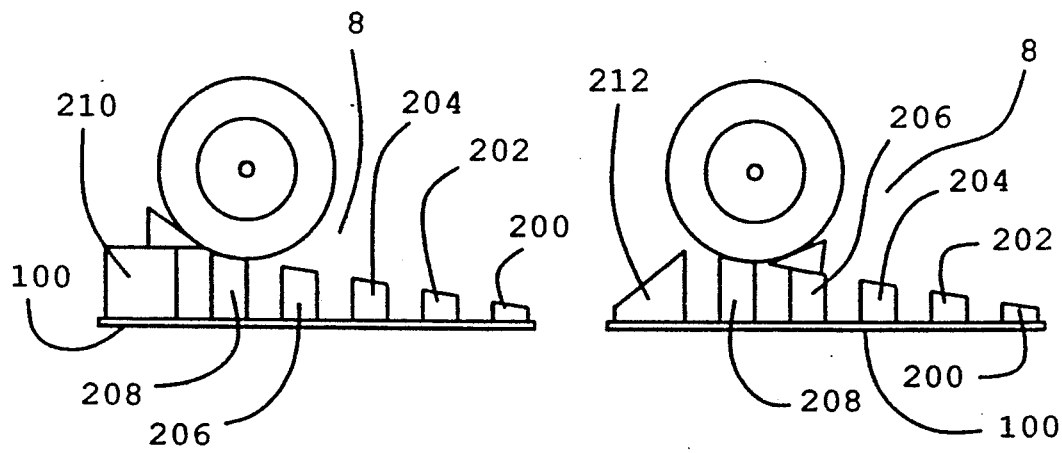
FIG. 8 is a side elevation view of the preferred embodiments of the flexible leveling device of the invention with a tandem axle RV elevated and chocked.

In using the device of the invention, as practiced using the preferred or alternative embodiments, the RV is initially driven to the location where it is to be leveled, and a device(s) is placed behind the rear wheel(s) of the RV to be elevated to a level position, with the first, or lower, end of the device(s) properly positioned adjacent to and in the line of travel of the tire of the rearward wheel(s). If required, a second device(s), with a reversed final block, is then placed with its first, or lower, end properly positioned in relation to the tire of the forward wheel(s), and, with the device formed into a curved configuration in the space between the two tires, the lower surface of the flexible strip is placed against the rearward tire, as shown in FIG. 5. Although the placement illustrated in FIG. 5 is preferred, the second device may be positioned as shown in FIG. 6. The RV is then slowly moved backward onto the device(s) until the RV has been raised to the desired level. As the wheels of the Rv move onto the devices, with a second device positioned as illustrated in FIG. 6, the second end of the second device drops to the ground in a position to receive the wheel as the RV is moved farther onto both devices. When the RV is properly positioned and leveled, wheel chocks are preferably used on both sides of the RV to generally assure stability and to prevent the Rv from rolling off the devices of the invention, as generally shown in FIGS. 7 and 8. Alternatively to backing the RV onto the device(s), it may be moved forward onto them within the scope of the method of the invention, with appropriate variation in the placement of the device(s) relative to the wheel(s) of the RV.

When it is desired to move the Rv to another location, the wheel chocks are first removed and the RV is simply driven or towed forward so that the tire(s) move onto the ground. When a device with a reversed final block 212 is used, the slant of that final block 212 facilitates movement of the wheel(s) of the RV over that device. When the Rv is moved off the device(s), the device(s) may be easily rolled or folded for convenient storage until again needed. If the RV is moved forward onto the devices and moved forward off the devices, the use of a device with a final reversed block 212 is not necessary, as the wheel(s) of the RV do not then move onto a device from the second end thereof.

The foregoing statement of objects and detailed description of the preferred and alternative embodiments of the flexible leveling device of the invention are illustrative, and not for purposes of limitation. The flexible leveling device of the invention is susceptible to various other modifications and alternative embodiments without departing from the scope and spirit of the invention as claimed.

What is claimed is:

1. A flexible leveling device comprising:
   an elongate flexible member of substantially greater length than width and of substantially greater width than thickness, said elongate member having first and second ends, a longitudinal axis, and an upper face and a lower face; and
   a multiplicity of discrete bodies, the number of said bodies being not less than three, each having a base parallel to said longitudinal axis of said elongate member, two first sides extending upwardly from said base, two second sides extending upwardly from said base with edges of said second sides interconnected to adjacent edges of said first sides, and a top, each said base of each of said bodies being disposed on and interconnected to said upper face of said elongate member so as to provide a space between adjacent bodies, said bodies being of varying height with the shortest of said bodies being disposed near said first end of said elongate member and said bodies increasing in height from said first end of said elongate member to said second end thereof.

2. The device of claim 1, wherein said top of each of said bodies is inclined relative to the plane of said base of such body, and said bodies are disposed on said elongate member such that a line tangent to the top surface of each of said bodies describes a straight line.

3. The device of claim 1, wherein said top of said body nearest said second end of said elongate member is parallel to the plane of said base of such body.

4. The device of claim 3, wherein said top of each of said bodies, except said body nearest said second end of said elongate member, is inclined relative to the plane of said base of such body, and said bodies, except said body nearest said second end of said elongate member, are disposed on said elongate member such that a line tangent to the top surface of each of said bodies, except said body nearest said second end of said elongate member, describes a straight line, and wherein said body nearest said second end of said elongate member is disposed on said elongate member such that said straight line intersects the line formed by said top and said side nearest said first end of said elongate member.

5. The device of claim 1, wherein said top of each of said bodies, except said body nearest said second end of said elongate member, is inclined relative to the plane of said base of such body, and said bodies, except said body nearest said second end of said elongate member, are disposed on said elongate member such that a line tangent to the top surface of each of said bodies, except said body nearest said second end of said elongate member, describes a straight line, and wherein said top of said body nearest said second end of said elongate member is inclined relative to the plane of said base of such body in an opposite direction relative to the incline of said tops of said remaining bodies.

6. The device of claim 5, wherein said body nearest said second end of said elongate member is disposed on said elongate member such that said straight line intersects the line formed by said top and said side nearest said first end of said elongate member of said body.

7. The device of claim 1, wherein said top of each of said bodies is parallel to the plane of said base of such body, and said bodies are disposed on said elongate member such that a line intersecting each line formed by said top and said side nearest said first end of said elongate member of each of said bodies describes a straight line.

8. The device of claim 1, wherein said top of each of said bodies, except said body nearest said second end of said elongate member, is parallel to the plane of said base of such body, and said bodies, except said body nearest said second end of said elongate member, are disposed on said elongate member such that a line intersecting each line formed by said top and said side nearest said first end of said elongate member of each of said bodies, except said body nearest said second end of said elongate member, describes a straight line, and wherein said top of said body nearest said second end of said elongate member is inclined relative to the plane of said base of such body in an opposite direction relative to the incline of said straight line.

9. The device of claim 8, wherein said body nearest said second end of said elongate member is disposed on said elongate member such that said straight line intersects the line formed by said top and said side nearest said first end of said elongate member of said body.

10. The device of claim 1, wherein the depth of each of said bodies, measured along the longitudinal axis of said elongate member, is the same.

11. The device of claim 1, wherein the depth of each of said bodies, except for said body nearest said second end of said elongate member, measured along the longitudinal axis of said elongate member, is the same, and wherein the depth of said body nearest said second end of said elongate member is greater than the depth of the other said bodies.

12. The device of claim 1, wherein said top of each of said bodies includes means for resisting slippage.

13. The device of claim 1, wherein each said body is solid.

14. The device of claim 1, wherein each said body is hollow.

15. The device of claim 1, wherein each said body is constructed of wood.

16. The device of claim 1, wherein each said body is constructed of plastic or rubber.

17. The device of claim 1, wherein each said body is constructed of metal.

18. The device of claim 1, wherein said elongate member is constructed of plastic or rubber.

19. The device of claim 1, wherein said elongate member is constructed of metal.

20. A flexible leveling device comprising:

a multiplicity of discrete bodies, the number of said bodies being not less than three, each having a longitudinal axis, a base parallel to said longitudinal axis of said body, two first sides extending upwardly from said base, two second sides extending upwardly from said base with edges of said second sides interconnected to adjacent edges of said first sides, and a top, said bodies being of varying height relative to each other, said bodies being disposed in an array with their longitudinal axes in coaxial alignment and with a space between adjacent bodies in said array, and said bodies being arranged in said array in increasing height relationship with the shortest of said bodies at a first end of said array and the highest of said bodies at a second end of said array; and means of flexibly interconnecting said bodies in said array so as to maintain the disposition of said bodies in said array and form a structure having a first end associated with said first end of said array and a second end associated with said second end of said array.

21. The device of claim 20, wherein each of said bodies further includes an aperture extending through said body with the axis of each said aperture parallel to said longitudinal axis of the associated body, and wherein said means of flexibly interconnecting said bodies is a flexible member extending through said apertures of said bodies and interconnected to said bodies.

22. The device of claim 20, wherein each of said bodies further includes a plurality of apertures extending through said body with the axis of each said aperture parallel to said longitudinal axis of the associated body, and wherein said means of flexibly interconnecting said bodies is a plurality of flexible members, equal in number to the number of said apertures extending through each of said bodies, with each of said members extending through one of said apertures in each of said bodies and interconnected to said bodies.

23. The device of claim 20, wherein each of said bodies is formed so as to interlock with the adjacent body or bodies, and wherein said means of flexibly interconnecting said bodies is a pivotal interconnection between each body and the adjacent body or bodies.

24. A flexible leveling device comprising:
an elongate flexible member of substantially greater length than width and of substantially greater width than thickness, said member having first and second ends, a longitudinal axis, and an upper face and a lower face; and
a multiplicity of discrete bodies, the number of said bodies being not less than three, each having a longitudinal axis perpendicular to said longitudinal axis of said elongate member and parallel to said upper face of said elongate member, each of said bodies disposed on and interconnected to said upper face of said elongate member so as to provide a space between adjacent bodies, said bodies being of varying cross-sectional dimension with respect to each other, the smallest of said bodies being disposed near said first end of said elongate member and said bodies increasing in cross-sectional dimension from said first end of said elongate member toward said second end thereof.

25. The device of claim 24, wherein said elongate member is constructed of plastic or rubber.

26. The device of claim 24, wherein said elongate member is constructed of metal.

27. The device of claim 24, wherein said bodies are circular in cross-section, and wherein said bodies increase in cross-sectional dimension from said first end of said elongate member through a majority of the length of said elongate member and then decrease in cross-sectional dimension to said second end of said elongate member.

28. A method of leveling a vehicle across the longitudinal axis of the vehicle on a slanted surface by elevating one side of such vehicle, such vehicle having at least one axle generally perpendicular to the longitudinal axis of the vehicle and a wheel and tire assembly at each end of each such axle, using one leveling device for each axle, with each such leveling device having a longitudinal axis, first and second ends, and a multiplicity of discrete bodies, not less than three in number, disposed in spaced relationship, such bodies increasing in height from the first end of such leveling device to the second end thereof to provide a linear ramp, comprising the steps of:

initially positioning said vehicle at or near the desired location on such surface;
placing one such leveling device on such surface adjacent to each tire on the side of the vehicle to be elevated wit the longitudinal axis of each such leveling device in the plane of such tire and with the first end of each such leveling device nearest to the associated tire; and
moving the vehicle such that each tire on the side of the vehicle to be elevated moves onto the associated leveling device from the first end thereof toward the second end thereof, thereby raising each such tire from such surface a distance linearly proportional to the distance of movement of the vehicle and elevating the side of the vehicle associated therewith relative to such surface; and
continuing such movement of the vehicle until the side of the vehicle to be elevated is raised to the desired position.

29. The method of claim 28 comprising the additional step of positioning one or more wheel chocks adjacent to at least one wheel disposed on a leveling device after the side of the vehicle to be elevated is raised to the desired position so as to restrain undesired movement of the vehicle.

30. The method of claim 28 wherein the vehicle to be leveled has at least two axles disposed in closely spaced tandem relation with at least one tire on each side of the vehicle associated with each axle and the distance between adjacent tires measured along such surface is less than the length of each such leveling device, wherein each such leveling device may be formed into a curve, and wherein the step of placing one such leveling device on such surface adjacent to each tire on the side of the vehicle to be elevated includes forming each such leveling device to be placed between adjacent tires of the vehicle into a curve prior to placing that leveling device on such surface, so that the first end and a portion of the length of each such leveling device placed between adjacent tires is in contact with such surface and the remainder of the length of each such leveling device placed between adjacent tires is disposed in the space between such adjacent tires in a curved configuration.

* * * * *